(12) United States Patent
Hu et al.

(10) Patent No.: US 8,370,867 B1
(45) Date of Patent: Feb. 5, 2013

(54) OPTICAL DISK DRIVE

(75) Inventors: Wei-Chieh Hu, Hsinchu (TW);
Sz-Shian He, Hsinchu (TW); Shih-Ming Hsu, Hsinchu (TW); Yung-Han Wu, Hsinchu (TW); Sheng-Fa Hou, Hsinchu (TW); Ho-Ting Hsieh, Hsinchu (TW); In-Shuen Lee, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 13/232,977

(22) Filed: Sep. 14, 2011

(30) Foreign Application Priority Data

Aug. 16, 2011 (CN) .......................... 2011 1 0234085

(51) Int. Cl.
*G11B 17/04* (2006.01)

(52) U.S. Cl. ...................................................... 720/695
(58) Field of Classification Search .................. 720/695
See application file for complete search history.

(56) References Cited

U.S. PATENT DOCUMENTS 6,438,087 B2 * 8/2002 Omori ........................... 720/604
6,704,271 B2 * 3/2004 Masaki et al. ................. 720/701

* cited by examiner

*Primary Examiner* — Mark Blouin
(74) *Attorney, Agent, or Firm* — Jianq Chyun IP Office

(57) ABSTRACT

An optical disk drive including a housing, a top cover, a spindle motor and a supporting element is provided. The housing has an accommodating space. The top cover covers the accommodating space. The spindle motor is disposed within the accommodating space and has a shaft. The supporting element is disposed between an end of the shaft and the top cover. When the top cover is deformed, the shaft props up the top cover through the supporting element.

12 Claims, 2 Drawing Sheets

OPTICAL DISK DRIVE

CROSS-REFERENCE TO RELATED APPLICATION

This application claims the priority benefit of China application serial no. 201110234085.6, filed Aug. 16, 2011. The entirety of the above-mentioned patent application is hereby incorporated by reference herein and made a part of this specification.

BACKGROUND OF THE INVENTION

1. Field of the Invention

The present invention relates to an electronic apparatus, and more particularly, to an optical disk drive.

2. Description of Related Art

Advanced computer technology is capable of processing a variety of data types and therefore a larger storage capacity is needed. Since an optical disk is advantageous in cheap price, carrying convenience, large storage capacity, easy-storing, longer storage life and robust from damage, general traditional magnetic storage medium has been gradually replaced by optical disk, and optical disk has become an indispensable optical storage medium nowadays. With the widespread use of the optical disks, the optical disk drive (ODD) for reading the data in the optical disk has also become a common electronic product in daily life.

In general, a spindle motor and an optical pickup head are disposed within the optical disk drive. The spindle motor is used to carry the disk and rotates the disk in high speed, so that the optical pickup head can read the data of the disk. The optical disk drive advances gradually toward a trend of thinner designs by which the distance between the top cover and the disk becomes less and less. Under the condition of the top cover is extremely close to the disk, when the top cover is subjected to a loading pressure and if the top cover deforms due to the insufficiency of the structural strength, then the top cover would be easy to contact with the disk and affect the disk's normal operation.

SUMMARY OF THE INVENTION

The present invention provides an optical disk drive capable of preventing the top cover from deformation and sagging.

An optical disk drive including a housing, a top cover, a spindle motor and a supporting element is provided. The housing has an accommodating space. The top cover covers the accommodating space. The spindle motor is disposed within the accommodating space and has a shaft. The supporting element is disposed between an end of the shaft and the top cover. When the top cover is deformed, the shaft props up the top cover through the supporting element.

According to an embodiment of the present invention, the supporting element is fixed to an end of the shaft and props up the top cover.

According to an embodiment of the present invention, the supporting element has a contact terminal and props up the top cover through the contact terminal. The shaft rotates along an axis. The axis passes through the contact terminal.

According to an embodiment of the present invention, the supporting element is fixed to the top cover and the shaft props up the supporting element.

According to an embodiment of the present invention, the supporting element has a contact terminal. The shaft props up the contact terminal. The shaft rotates along an axis. The axis passes through the contact terminal.

According to an embodiment of the present invention, the supporting element is a portion of the top cover.

According to an embodiment of the present invention, the supporting element includes a rivet, a roller or a spacer.

According to an embodiment of the present invention, the supporting element is a portion of the shaft.

According to an embodiment of the present invention, a separating element is disposed on the top cover, the spindle motor or the supporting element so as to reduce the noise generated when the supporting element contacts with the top cover.

According to an embodiment of the present invention, the separating element is an anti-wear sheet, an anti-friction sheet, a fabric sheet or a plastic sheet.

In light of the above, a supporting element is disposed between an end of the shaft and the top cover in the present invention, so that the shaft props up the top cover through the supporting element. Thus, the deformation and sagging of the top cover due to the insufficiency of structural strength can be prevented, so as to ensure the disk may not be affected by the loading pressure of the top cover during the operation, and the whole structure can be firmer.

In order to make the aforementioned and other features and advantages of the invention more comprehensible, embodiments accompanying figures are described in detail below.

DESCRIPTION OF EMBODIMENTS

Figure 1:
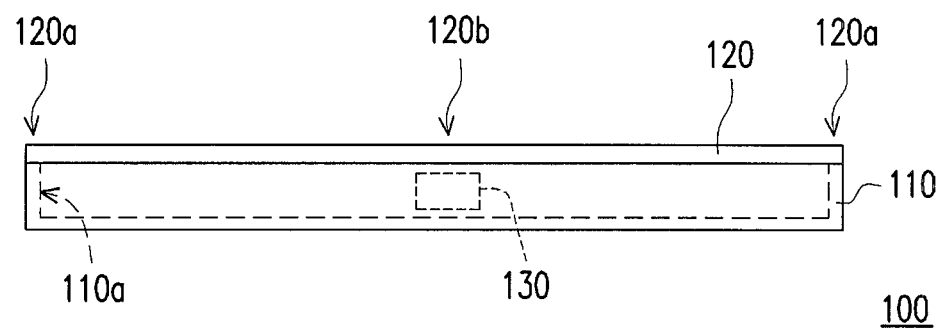
FIG. 1 is a schematic view of an optical disk drive according to an embodiment of the present invention.
Figure 2:
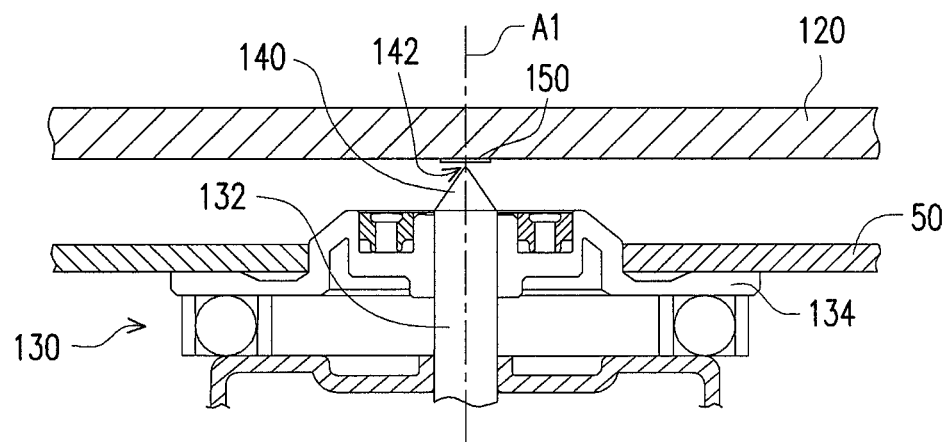
FIG. 2 is a partial sectional view of the optical disk drive of FIG. 1.

FIG. 1 is a schematic view of an optical disk drive according to an embodiment of the present invention. FIG. 2 is a partial sectional view of the optical disk drive of FIG. 1. The optical disk drive can be a tray-type optical disk drive or a slot-in optical disk drive, which is not limited in the present invention. Referring to FIG. 1 and FIG. 2, the optical disk drive 100 of the present embodiment includes a housing 110, a top cover 120, a spindle motor 130 and a supporting element 140. The housing 110 has an accommodating space 110a. And the top cover 120 covers the accommodating space 110a. The spindle motor 130 is disposed within the accommodating space 110a and has a shaft 132. The shaft 132 is used to carry and rotate the disk 50. A gap exists between the top cover 120 and the shaft 132. The supporting element 140 is disposed between an end of the shaft 132 and the top cover 120. When the top cover 120 is not deformed, the supporting element 140 does not contact the top cover 120, as shown in FIG. 2. When the top cover 120 is deformed by external loading force/pressure, the shaft 132 props up the top cover 120 through the supporting element 140 (not shown).

In such configuration, since the supporting element 140 is disposed between the end of the shaft 132 and the top cover 120 to cause the shaft 132 to prop up the top cover 120 through the supporting element 140, the deformation and sagging of the top cover 120 due to the insufficiency of the structural strength can be prevented and the loading pressure of the top cover 120 not affecting the disk 50 during operation can also be ensured, and the whole structure can be firmer.

As shown in FIG. 1, the housing 110 supports at least a portion of the peripheral 120a of the top cover 120. And the center area 120b of the top cover 120 is the weakest portion comparing to the whole structure. The function of the supporting element 140 is to support the center area 120b of the top cover 120 so as to effectively increase the structural strength.

As shown in FIG. 2, in the present embodiment, the spindle motor 130 has a base 134. The base 134 is fixed to the shaft 132 and used to carry the disk 50 so that the disk 50 can be rotated by the spindle motor 130. The supporting element 140 of the embodiment is fixed to the end of the shaft 132 and can prop up the top cover 120, so that the top cover 120 is supported by the shaft 132 when the top cover 120 is deformed. When the top cover 120 is not deformed, the supporting element 140 does not contact with the top cover 120 and thus the spindle motor 130 can smoothly rotate.

More specifically, the cross section of the supporting element 140 is a triangle, the apex has a contact terminal 142 and the supporting element 140 props up the top cover 120 with the contact terminal 142. The shaft 132 is used to rotate along the axis A1. And the axis A1 is designed to pass through the contact terminal 142, so that the shaft 132 can rotate the supporting element 140 rotate. And when the top cover 120 is deformed due to a loading pressure and contacts with the supporting element 140, since the existence of a small friction force between the top cover 120 and the supporting element 140 (contact terminal 142), the rotation of the spindle motor 130 may not be affected. The supporting element 140 shown in FIG. 2 is for illustration only, and it can be a rivet, a roller, a spacer or any other suitable element. In other embodiment, the supporting element 140 can be configured by means of any other way, and it is described accompanied with figures in the following.

Additionally, when the top cover 120 is deformed due to the loading pressure and contacts the supporting element 140, a noise is caused because of the rotation of the spindle motor 130. In order to eliminate or reduce the noise, a separating element 150 can be disposed on the top cover 120. Thus, the noise due to the rotation when the supporting element 140 contacts the separating element 150 may be reduced. The separating element 150 can be an anti-wear sheet, an anti-friction sheet, a fabric sheet, a plastic sheet or any other material suitable for the noise eliminating or noise reduction, and the present invention is not limited thereto.

Figure 3:
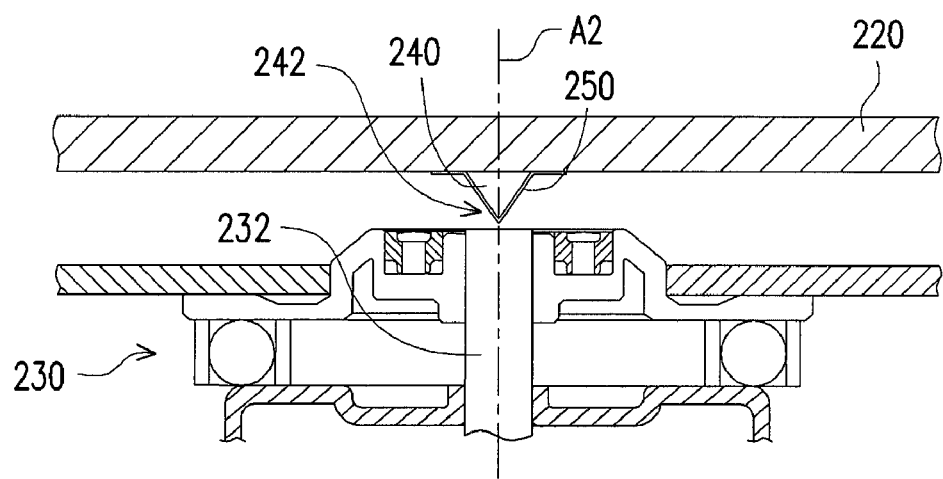
FIG. 3 is a partial sectional view of an optical disk drive according to another embodiment of the present invention.

FIG. 3 is a partial sectional view of an optical disk drive according to another embodiment of the present invention. Please refer to FIG. 3. The supporting element 240 of the embodiment is fixed to the top cover 220. The shaft 232 of the spindle motor 230 can props up the supporting element 240 to support the top cover 220. Particularly, the supporting element 240 has a contact terminal 242 and the shaft 232 props up the contact terminal 242. The shaft 232 is used to rotate along an axis A2. The axis A2 passes through the contact terminal 242, so that a small friction force exists between the shaft 232 and the supporting element 240 when the shaft 232 rotates and the top cover 220 is subjected to a loading pressure. In order to reduce the noise, the separating element 250 is disposed on the supporting element 240. However, the separating element 250 can also be disposed on the spindle motor 230 for contacting the supporting element 240. The supporting element 240 shown in FIG. 3 is for illustration only, and it can be a rivet, a roller, a spacer or any other suitable element. In addition, the supporting element 240 can also be a protrusion or a bump formed by punching the top cover 220.

Figure 4:
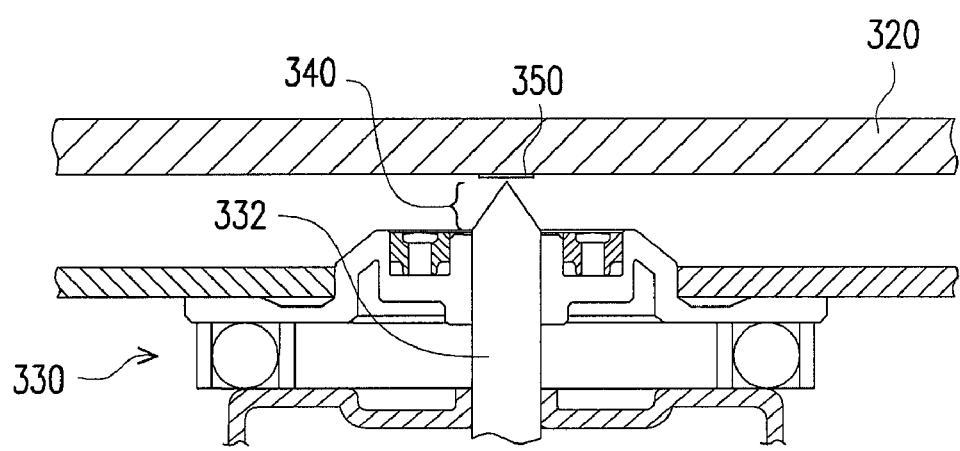
FIG. 4 is a partial sectional view of an optical disk drive according to another embodiment of the present invention.

FIG. 4 is a partial sectional view of an optical disk drive according to another embodiment of the present invention. Please refer to FIG. 4. The supporting element 340 of the embodiment is a portion of the shaft 332 and props up the top cover 320 so that the top cover 320 can obtain a direct support from the shaft 332 when the top cover 320 is deformed. In order to reduce the noise, the separating element 350 is disposed on the supporting element 340. However, the separating element 350 can also be disposed at the top cover 320.

In light of the foregoing, a supporting element is disposed between an end of the shaft and the top cover in the present invention, so that the shaft props up the top cover through the supporting element. Thus, the deformation and sagging of the top cover due to the insufficiency of structural strength can be prevented, so as to ensure the disk may not be affected by the loading pressure of the top cover during the operation, and the whole structure can be firmer. Furthermore, it can be selected as required that the supporting element is designed fixing to the top cover, fixing to the shaft of the spindle motor or being a portion of the shaft or top cover, in order to improve the convenience in design and fabrication.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An optical disk drive, comprising:
   a housing having an accommodating space;
   a top cover covering the accommodating space;
   a spindle motor disposed within the accommodating space and having a shaft; and
   a supporting element disposed and fixed on an end of the shaft, wherein when the top cover is deformed, the top cover is propped up by contacting the supporting element directly.

2. The optical disk drive as claimed in claim 1, wherein the supporting element has a contact terminal and props up the top cover through the contact terminal, the shaft rotates along an axis, the axis passes through the contact terminal.

3. The optical disk drive as claimed in claim 1, wherein the supporting element comprises a rivet, a roller or a spacer.

4. The optical disk drive as claimed in claim 1, wherein the supporting element is a portion of the shaft.

5. The optical disk drive as claimed in claim 1, wherein a separating element is disposed on the top cover, or the supporting element so as to reduce the noise generated when the supporting element contacts with the top cover.

6. The optical disk drive as claimed in claim 5, wherein the separating element is an anti-wear sheet, an anti-friction sheet, a fabric sheet or a plastic sheet.

7. An optical disk drive, comprising:
   a housing having an accommodating space;
   a top cover covering the accommodating space;
   a spindle motor disposed within the accommodating space and having a shaft; and
   a supporting element disposed and fixed to the top cover, wherein when the top cover is deformed, the shaft props up the supporting element to support the top cover.

8. The optical disk drive as claimed in claim 7, wherein the supporting element has a contact terminal, the shaft props up the contact terminal, the shaft rotates along an axis, the axis passes through the contact terminal.

9. The optical disk drive as claimed in claim 7, wherein the supporting element is a portion of the top cover.

10. The optical disk drive as claimed in claim 7, wherein the supporting element comprises a rivet, a roller or a spacer.

11. The optical disk drive as claimed in claim 7, wherein a separating element is disposed on the spindle motor or the supporting element so as to reduce the noise generated when the supporting element contacts with the shaft.

12. The optical disk drive as claimed in claim 11, wherein the separating element is an anti-wear sheet, an anti-friction sheet, a fabric sheet or a plastic sheet.

* * * * *